No. 865,494. PATENTED SEPT. 10, 1907.
W. HENKE.
ADVERTISING APPARATUS.
APPLICATION FILED NOV. 1, 1906.

2 SHEETS—SHEET 1.

Witnesses
Max B. A. Doring
Johanne Daumberger

Inventor
Willy Henke
By his Attorney
Max v. Ordmann

No. 865,494. PATENTED SEPT. 10, 1907.
W. HENKE.
ADVERTISING APPARATUS.
APPLICATION FILED NOV. 1, 1906.

2 SHEETS—SHEET 2.

Witnesses
Max P. A. Döring
Johanne Daumberger

Inventor
Willy Henke
By his Attorney
Max L. Ordmann

THE NORRIS PETERS CO., WASHINGTON, D. C.

UNITED STATES PATENT OFFICE.

WILLY HENKE, OF JERSEY CITY HEIGHTS, NEW JERSEY.

ADVERTISING APPARATUS.

No. 865,494.           Specification of Letters Patent.           Patented Sept. 10, 1907.

Application filed November 1, 1906. Serial No. 341,574.

*To all whom it may concern:*

Be it known that I, WILLY HENKE, a subject of the German Emperor, and a resident of Jersey City Heights, county of Hudson, State of New Jersey, have invented certain new and useful Improvements in Advertising Apparatus, of which the following is a specification.

The present invention pertains to an advertising apparatus in which letters, figures, pictures, or any other advertising matters are so arranged on flexible plates that they can be bent and twisted and brought into various shapes, or caricatured so as to attract attention.

My invention is illustrated in the accompanying drawings, in which

Figure 1:
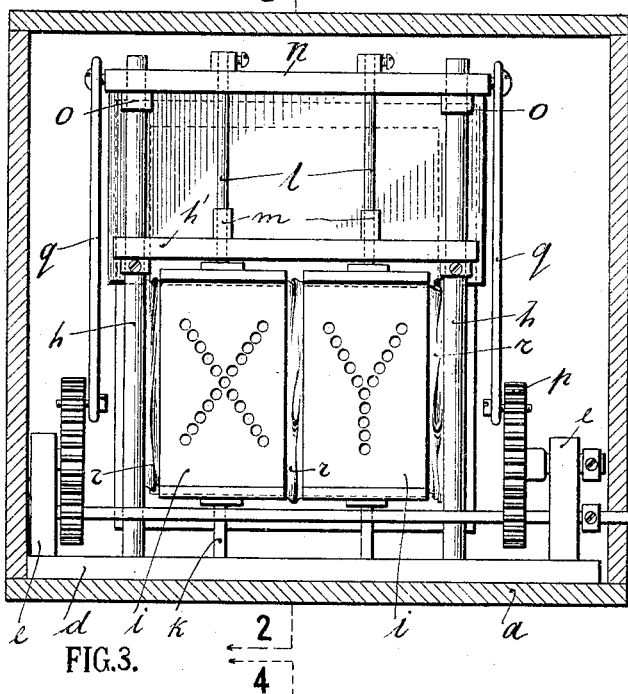
Figure 2:
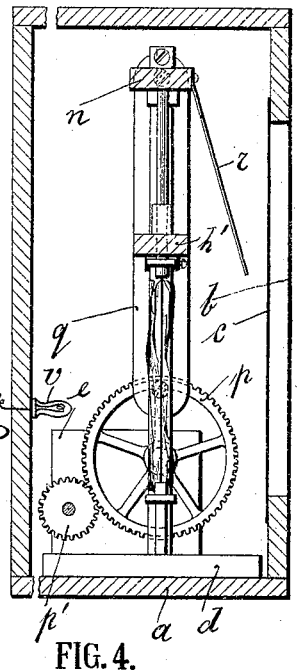
Figure 3:
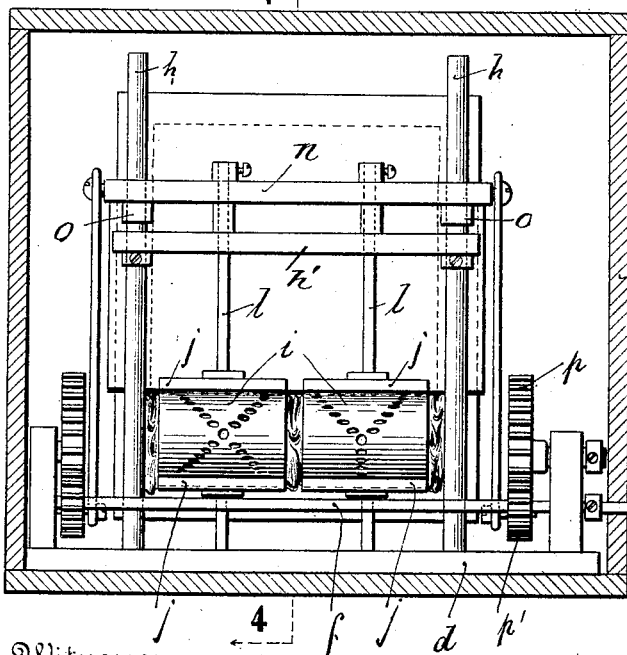
Figure 4:
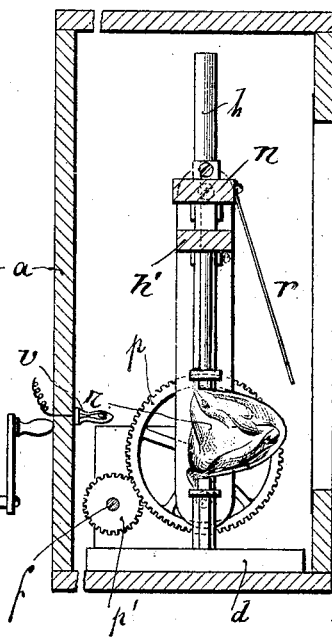
Figure 5:
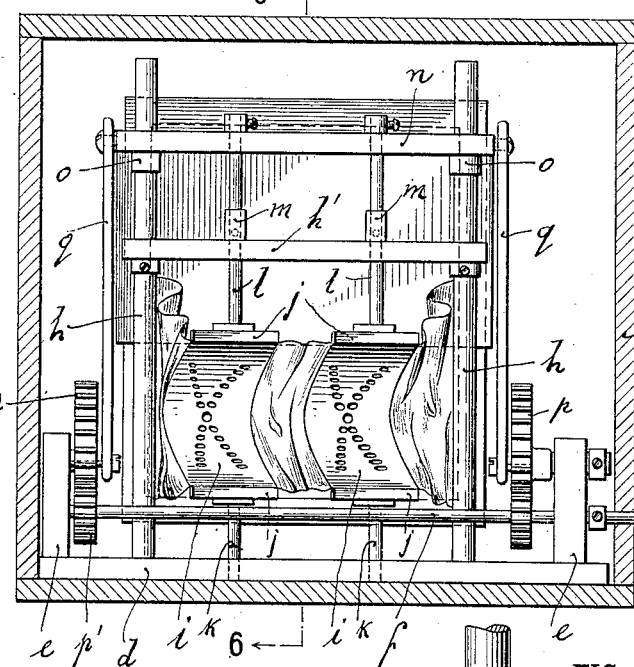
Figure 6:
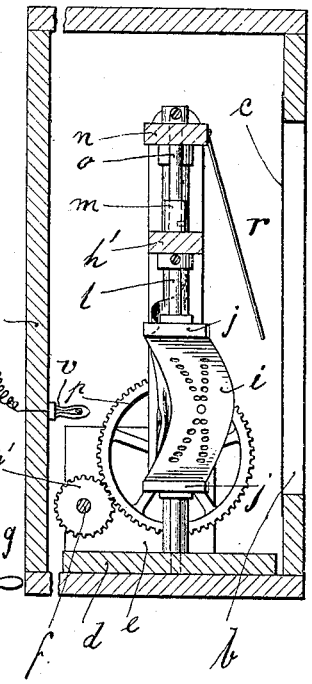
Figure 7:
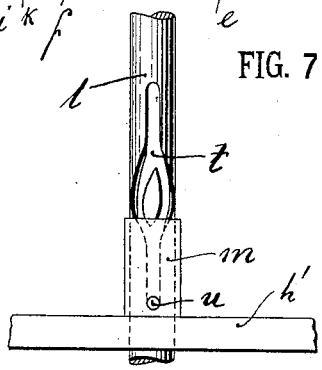
Figure 8:
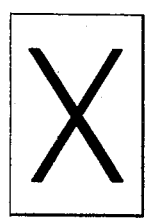
Figure 9:
Figure 10:
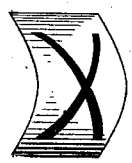

Figure 1 is a vertical section through the casing in which the apparatus is arranged, the advertising matter being shown in stretched position; Fig. 2 is a section through line 2—2 of Fig. 1; Fig. 3 is a similar section to Fig. 1, showing the advertising matter bent or curved; Fig. 4 is a cross section on line 4—4 of Fig. 3; Fig. 5 is a similar section to Figs. 1 and 3, showing the advertisement matter bent and twisted; Fig. 6 is a cross section on line 6—6 of Fig. 5; Fig. 7 is a detail of construction, and Figs. 8, 9 and 10 illustrate various positions into which the advertising matter is brought during the operation of the apparatus.

My apparatus consists of a casing $a$ which is provided with a display window $b$ adapted to be covered with a canvas $c$ onto which the advertising matter is to be projected. On the bottom of the casing there is a base plate $d$ to which brackets $e\ e$ are secured. In these brackets a shaft $f$ extending horizontally through the casing is borne. One end of the shaft extends outwards from the casing and may carry a crank $g$ for the operation of the shaft either manually, mechanically or electrically.

Rising from the base plate $d$ are standards or rods $h, h$ which are connected by a traverse $h'$. Between these standards a plate or plates $i$ of any suitable flexible material, as sheet metal or the like, are arranged to normally extend in upright position. The same are at the upper and lower ends stiffened by boards $j\ j$. The lower end of the plate is in its center provided with a projection $k$ which is pivotally borne in the base plate $d$ and the upper end thereof carries a rod $l$ that is adapted to loosely project through a sleeve $m$ provided on the traverse $h'$ so as to be capable of sliding therein, up and down.

At the free end, the rod $l$ is attached to a cross bar $n$ that by means of sleeves $o\ o$ is slidably borne on the outer ends of the standards $h, h$. The cross bar receives its vertical movement from the shaft $f$ by means of gears $p, p'$ and connecting rods $q, q$.

The advertising matter that might be letters, names, or pictures is represented by perforations made in the flexible plate or plates, through which the rays from the light $v$ at the rear of the casing will be thrown onto the canvas. If a name or whole sentence is used, each letter would be arranged on a separate flexible plate. To protect the rays of the light from passing through the free spaces between the adjoining plates and above the same, blinds $r$ of cloth or the like may be provided to cover said spaces.

By the rotation of the shaft $f$ the cross piece receives an upward and downward movement whereby the plates will alternately bend and stretch, thereby having the effect that the letters, figures or pictures thrown onto the canvas will be either stretched or contracted as shown in Figs. 8 and 9. Simultaneously I allow the plates to turn, whereby the advertising matter will become twisted (as shown in Figs. 5 and 10). To accomplish this object, the rod $l$ projecting from the upper end of the plate is provided with a curved groove $t$ (Fig. 7) in which a projection $u$ arranged on the inner surface of the sleeve $m$ of the traverse $h'$ is adapted to slide during the upward and downward movement of the rod. Owing to the pivotal connection of the plate $i$ with the base $d$, the plate will, during its vertical movement receive also a rotary movement. The curved groove may be of any desired shape, and in case of several plates being used, may vary with each plate, whereby each letter or figure will receive a different movement. In the drawing, the groove $t$ is shown in shape of a loop.

What I claim and desire to secure by Letters Patent is.

1. An advertising apparatus consisting of flexible plates bearing the advertising matter, said plates being capable of being bent, stretched and twisted, and means for changing the shape of said plates, substantially as and for the purpose specified.

2. An advertising apparatus, comprising flexible plates on which the advertising matter is formed by perforations, said plates being capable of being alternately bent, stretched and twisted, whereby the advertising matter is brought into different shape, and means for changing the shape of the plates, substantially as and for the purpose specified.

3. An advertising apparatus, comprising a casing having a window covered with canvas, flexible plates pivotally secured in the casing, and having their upper ends movable in vertical direction, the advertising matter being formed by perforations made on said plates, and means for moving the upper ends upward and downward, whereby the said plates become alternately bent, stretched and twisted, substantially as and for the purpose specified.

Signed at New York, this 30 day of October, 1906.

WILLY HENKE.

Witnesses:
   JOSEPH E. CAVANAUGH,
   MAX D. ORDMANN.